INSTANT ON

May 26, 1970 R. J. LUDLAM 3,514,532

SUPPLY CIRCUIT FOR PRE-HEATING THE FILAMENT OF A PICTURE
TUBE IN A TELEVISION RECEIVER

Filed Nov. 8, 1967

T5117 R

INVENTOR.
R. Joseph Ludlam
BY
Richard E. Bee
ATTORNEY

United States Patent Office 3,514,532

Patented May 26, 1970

3,514,532

SUPPLY CIRCUIT FOR PREHEATING THE FILAMENT OF A PICTURE TUBE IN A TELEVISION RECEIVER

Ralph Joseph Ludlam, Benton Harbor, Mich., assignor to Heath Company, St. Joseph, Mich., a corporation of Delaware

Filed Nov. 8, 1967, Ser. No. 681,438

Int. Cl. H04n *5/44;* H05b *41/16*

U.S. Cl. 178—7.5 5 Claims

ABSTRACT OF THE DISCLOSURE

In a television receiver, circuitry is provided for coupling a D.C. supply voltage to the filament of the receiver picture tube to partially energize same when the receiver is turned off and to fully energize the picture tube filament when the receiver is turned on.

Figure 1:
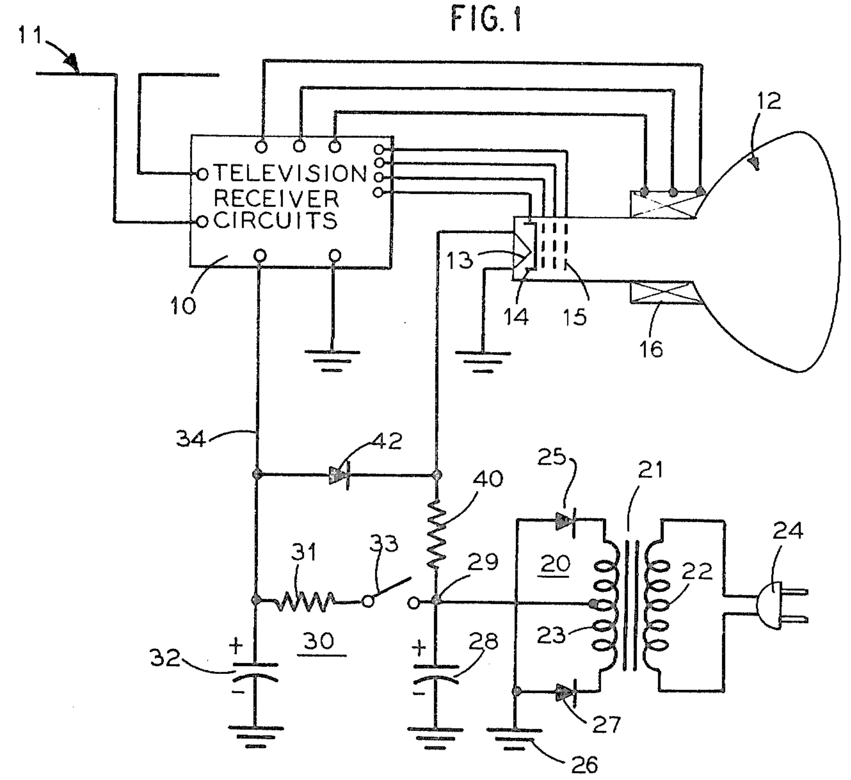

For an understanding of the invention, reference is had to the following description taken in connection with the accompanying drawings.

Figure 2:
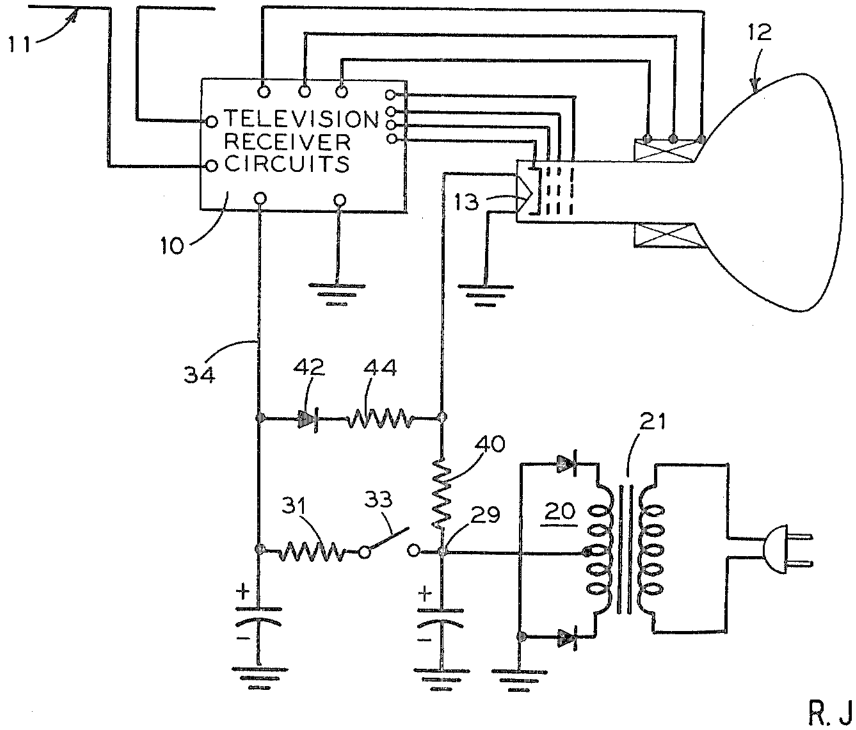

Referring to the drawings:

FIG. 1 illustrates in a schematic manner a first embodiment of the invention; and FIG. 2 illustrates in a schematic manner a second embodiment of the invention.

Referring to FIG. 1, television receiver circuits 10 are responsive to radio-frequency signals picked up by an antenna system 11 for producing television pictures on the face of a picture tube 12. Picture tube 12 includes a filament 13, a cathode 14 and control electrodes 15. Mounted on the neck of the picture tube 12 is a deflection yoke 16. Operating signals developed by the receiver circuits 10 are supplied to the control means represented by the cathode 14, the control electrodes 15 and the deflection yoke 16 for enabling the picture tube 12 to reproduce the transmitted television picture. Receiver circuits 10 are assumed to be of the transistor type.

Direct-current voltage for energizing the receiver circuits 10 is developed by means of a rectifier circuit 20. Such rectifier circuit includes a step-down power transformer 21 having a primary winding 22 and a center-tapped secondary winding 23. Primary winding 22 is connected to a power line plug 24 which is adapted to be connected to a 120-volt alternating-current power line. The upper end of secondary winding 23 is connected by way of a diode 25 to a chassis ground point 26. The lower end of secondary winding 23 is connected by way of a second diode 27 to the chassis ground point 26. The center tap on the secondary winding 23 is connected by way of a capacitor 28 to chassis ground. Circuit point 29 represents the output terminal of the rectifier circuit 20.

Rectifier circuit 20 is a full-wave rectifier circuit. It converts the alternating-current power line voltage into a unidirectional or direct-current voltage, the latter appearing across capacitor 28. In the present embodiment, the polarity of the diodes 25 and 27 is such that the polarity of the terminal point 29 is positive with respect to chassis ground.

Filter circuit means 30 represented by a resistor 31 and a capacitor 32 are provided for smoothing out any residual amplitude fluctuations or ripples in the unidirectional voltage appearing at the terminal point 29. The resistor 31 is connected to the terminal point 29 by way of a switch 33. The junction between resistor 31 and capacitor 32 is connected by means of a conductor 34 to the receiver circuits 10. Conductor 34 is connected to the direct-current supply voltage circuits of different ones of the individual circuits making up the receiver circuits 10. Consequently, when conductor 34 is energized by closing switch 33, the receiver circuits 10 are likewise energized and rendered operative. Thus, switch 33 constitutes means for turning the television receiver on and off.

In order to partially energize or preheat the picture tube filament 13 when the television receiver is turned off, impedance means represented by a resistor 40 is connected between the rectifier circuit output terminal 29 and the filament 13, the circuit being completed by way of chassis ground. In order to fully energize the filament 13 when the television receiver is turned on, a diode 42 is connected between the conductor 34 and the filament 13.

The FIG. 1 embodiment represents the case where the normal or rated operating voltage for the filament 13 of the picture tube 12 is of the same value as the direct-current supply voltage which is supplied to the receiver circuits 10 for energizing such circuits. Such voltage may be, for example, 12 volts.

Taking this 12-volt figure as the desired value, then when the power line plug 24 is plugged into a 120-volt alternating-current power line outlet and the switch 33 is open (position shown in the drawing), a unidirectional voltage of approximately +18 volts is developed at the rectifier terminal 29. This value is established by the step-down ratio of the transformer 21. With the switch 33 open, the receiver circuits 10 are de-energized or turned off. Because the receiver circuits 10 are not supplying some of the necessary operating potentials thereto, the picture tube appears to be unlit.

Current does, nevertheless, flow by way of the resistor 40 through the picture tube filament 13. The voltage dropping action of the resistor 40 causes the filament voltage to be about one-half its normal operating value. In the present example, this makes it about +6 volts. The current flowing through the filament 13 under this half-voltage condition serves to keep the filament 13 warm even though the television receiver is turned off. The reverse polarity of diode 42 with respect to the +6 volts appearing at the upper end of resistor 40 prevents any of this voltage from being applied to the receiver circuits 10.

When it is desired to turn the television receiver on, the switch 33 is closed. The voltage at the rectifier terminal 29 then assumes a value of +16 volts (because of the additional loading on the rectifier circuit). The resulting voltage at the junction between resistor 31 and capacitor 32 assumes a value of +12 volts. This +12 volt direct-current voltage is supplied by way of the conductor 34 to the receiver circuits 10, thus turning such circuits on.

With +12 volts applied to the anode of the diode 42, such diode becomes conductive and thus enables approximately 12 volts to be applied to the picture tube filament 13. (There will be a few tenths of a volt voltage drop across the diode 42 when it is conductive.) This 12 volts places the filament 13 at its rated operating voltage, thus fully energizing same. Because of the preheat voltage applied to the filament 13 when the television receiver was turned off, the filament 13 reaches it full operating temperature very quickly. This, in turn, causes the picture tube 12 to reach full brightness very quickly.

With the present circuit, the picture tube reaches a full brightness condition in less than one second. In the absence of the preheating provided by the present circuit, it would have taken approximately 11 to 14 seconds for the picture tube 12 to reach a full brightness condition. Thus, the preheating enables a television picture to be produced on the picture tube 12 at almost the same instant that the switch 33 is closed (assuming that the receiver circuits 10 are transistor circuits).

FIG. 2 represents the case where the rated operating voltage of the picture tube filament 13 is of a different value than is the direct-current supply voltage which is supplied to the receiver circuits 10. For sake of an example, it is assumed that the rated operating voltage for filament 13 is +12 volts while the direct-current supply voltage needed for the receiver circuits 10 is +24 volts. In this case, the turns ratio of the step-down transformer 21 is selected to provide the desired +24 volts on the conductor 34 when switch 33 is closed. In this case, it is also necessary to add an additional resistor 44 in series with the diode 42.

When the switch 33 is closed (receiver on), diode 42 is again conductive. In this case, however, resistor 44 serves to provide a voltage dropping action so that the net voltage applied to the picture tube filament 13 is the desired +12 volt value. As before, when switch 33 is open, a preheating voltage is applied by way of resistor 40 to the filament 13. The value of resistor 40 is selected to provide the necessary dropping action such that only one-half the normal operating voltage, i.e., 6 volts, is applied to the filament 13.

While the foregoing embodiments set forth basic circuit configurations, it should be borne in mind that in practice additional elements may sometimes be included in the circuits. For example, the resistor 31 may sometimes be replaced by a multi-element voltage regulator circuit. Also, a protective circuit breaker may be connected in series in the conductor line running between the rectifier terminal 29 and the resistor 40. Likewise, a circuit breaker may be connected in series in the conductor line running between the resistor 31 and the conductor 34. Also, various additional switches may be included in the circuit for purposes of switching from alternating-current power line operation to direct-current battery operation.

It should be noted that in the appended claims the term "supply circuit means" is used with different degrees of scope in different ones of the claims. A particular circuit element may sometimes be included within the term and sometimes excluded. The particular usage will be established by the remainder of the particular claim being considered.

What is claimed is:

1. In a television receiver, the combination comprising:
a picture tube having filament means and various con trol means;
receiver circuits for supplying operating signals to the picture tube control means;
a rectifier circuit for converting alternating-current power line voltage into unidirectional voltage;
supply circuit means including switch means for supplying unidirectional voltage to the receiver circuits for energizing same, the switch means serving to turn the television receiver on and off;
impedance means coupled to the supply circuit means intermediate the switch means and the rectifier circuit and coupled to the picture tube filament means for partially energizing the filament means when the television receiver is turned off;
and diode means coupled to the supply circuit means intermediate the switch means and the receiver circuits and coupled to the picture tube filament means for fully energizing the filament means when the television receiver is turned on.

2. In a television receiver, the combination comprising:
a picture tube having filament means and various control means;
receiver circuits for supplying operating signals to the picture tube control means;
a rectifier circuit adapted to be connected to an alternating-current power line for producing a unidirectional supply voltage at an output terminal of such circuit;
resistor means connected between the rectifier circuit output terminal and the picture tube filament means for partially energizing the filament means;
supply circuit means connected to the receiver circuits adapted to supply unidirectional voltage thereto;
switch means connected in series between the supply circuit means and the rectifier circuit output terminal for turning the television receiver on and off;
and diode means connected between the supply circuit means and the picture tube filament means for fully energizing the filament means when the switch means is closed.

3. In a television receiver, the combination comprising:
a picture tube having filament means and various control means;
receiver circuits for supplying operating signals to the picture tube control means;
a rectifier circuit adapted to be connected to an alternating-current power line for producing a unidirectional supply voltage at an output terminal of such circuit;
resistor means connected between the rectifier circuit output terminal and the picture tube filament means for partially energizing the filament means;
supply circuit means connected to the receiver circuits and adapted to supply unidirectional voltage thereto;
switch means connected in series between the supply circuit means and the rectifier circuit output terminal for turning the television receiver on and off;
and series-connected diode and resistor means connected between the supply circuit means and the picture tube filament means for fully energizing the filament means when the switch means is closed.

4. In a television receiver, the combination comprising:
a picture tube having filament means and various control means;
receiver circuits for supplying operating signals to the picture tube control means;
a rectifier circuit adapted to be connected to an alternating-current power line for producing a unidirectional supply voltage at an output terminal of such circuit;
resistor means connected between the rectifier circuit output terminal and the picture tube filament means for partially energizing the filament means;
supply circuit means connected to the receiver circuits and adapted to supply unidirectional voltage thereto;
switch means connected in series between the supply circuit means and the rectifier circuit output terminal for turning the television receiver on and off;
and diode means connected between the supply circuit means and the picture tube filament means for fully energizing the filament means when the switch means is closed, the diode means being connected with a polarity such that no appreciable current will flow through the diode means when the switch means is opened.

5. In a television receiver, the combination comprising:
a picture tube having filament means and various control means;
receiver circuits for supplying operating signals to the picture tube control means;
a rectifier circuit adapted to be connected to an alternating-current power line for producing a unidirectional supply voltage at an output terminal of such circuit;
filter circuit means for smoothing out amplitude variations in a unidirectional voltage;
switch means connected between the rectifier circuit output terminal and the filter circuit means for supplying unidirectional voltage to the filter circuit means when the switch means is closed;
direct-current supply circuit means connected to the filter circuit means and to the receiver circuits for supplying direct-current voltage thereto when the switch means is closed;

resistor means connected between the rectifier circuit output terminal and the picture tube filament means for partially energizing the filament means when the switch means is opened;

and diode means connected between the direct-current supply circuit circuit means and the picture tube filament means for fully energizing the filament means when the switch means is closed.

References Cited

UNITED STATES PATENTS

| | | | |
|---|---|---|---|
| 3,171,083 | 2/1965 | Heffron | 315—101 |
| 3,171,084 | 2/1965 | Sziklai | 315—101 |
| 3,339,105 | 8/1967 | Busse | 315—101 |

ROBERT L. GRIFFIN, Primary Examiner

G. G. STELLAR, Assistant Examiner

U.S. Cl. X.R.

315—101